No. 633,499. Patented Sept. 19, 1899.
T. J. BRAY.
COUPLING FOR PIPES, TUBES, OR CASINGS.
(Application filed June 29, 1899.)
(No Model.)
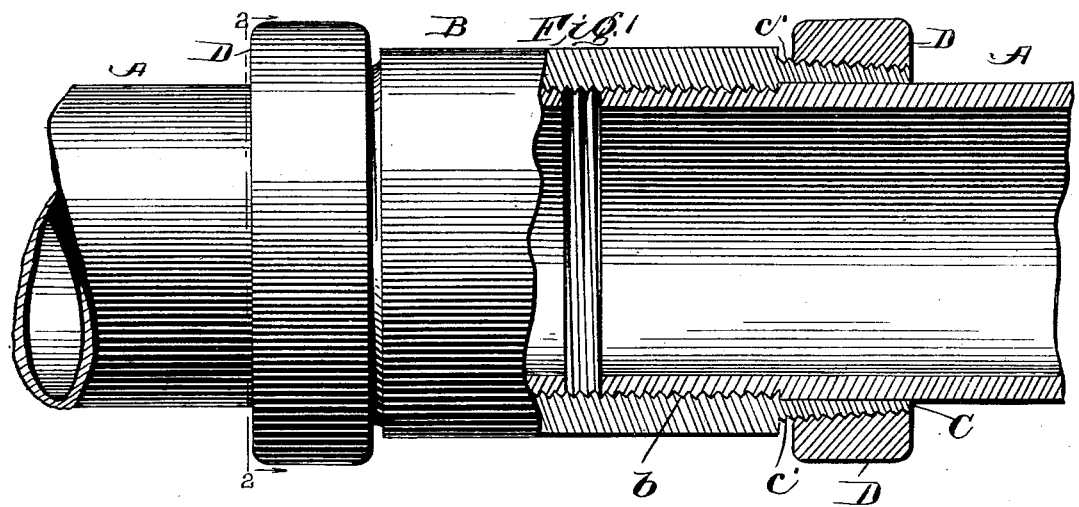
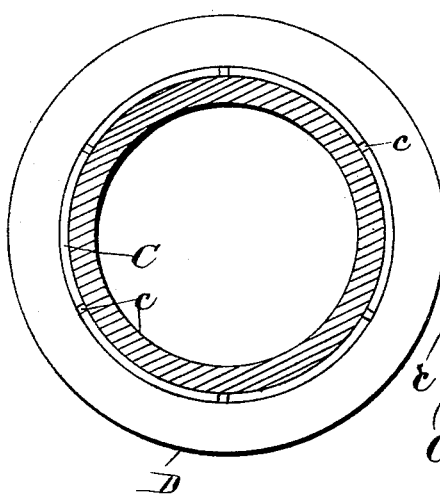
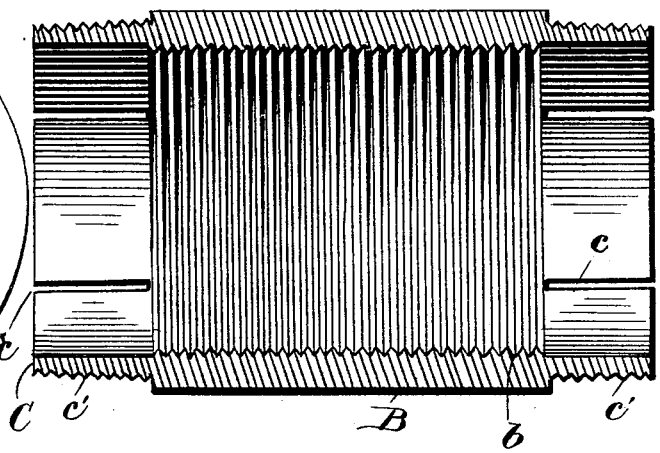
Witnesses:
J. M. Fowler Jr.
M. Darley
Inventor:
Thomas J. Bray
by F. W. Ritter Jr.
Attorney.
THE NORRIS PETERS CO., PHOTO-LITHO., WASHINGTON, D. C.

United States Patent Office.

THOMAS J. BRAY, OF PITTSBURG, PENNSYLVANIA, ASSIGNOR TO THE OIL WELL SUPPLY COMPANY, OF SAME PLACE.

COUPLING FOR PIPES, TUBES, OR CASINGS.

SPECIFICATION forming part of Letters Patent No. 633,499, dated September 19, 1899.

Application filed June 29, 1899. Serial No. 722,261. (No model.)

*To all whom it may concern:*

Be it known that I, THOMAS J. BRAY, a citizen of the United States, residing at Pittsburg, in the county of Allegheny, State of Pennsylvania, have invented certain new and useful Improvements in Couplings for Pipes, Tubes, or Casings; and I hereby declare the following to be a full, clear, and exact description of the same, reference being had to the accompanying drawings, in which—

Figure 1 is an elevation, partly in section, of a coupling embodying my invention. Fig. 2 is a transverse section of the same on the line 2 2, Fig. 1. Fig. 3 is a detached view, in longitudinal central section, of the coupling-sleeve embodying my invention; and Fig. 4 is a detached sectional view of the internally-threaded sleeve-ring.

Like symbols refer to like parts wherever they occur.

My invention relates generally to that class of devices commonly termed "pipe-couplings," whether the same be utilized for steam, water, or gas fitting, but has been especially devised for Artesian and oil well tubing and casing, as a class of joints which demands the highest strength and rigidity of the joint to resist constantly recurring shocks and vibrations. The greatest difficulties encountered in constructing such joints is the trouble of getting tight joints, a rigid connection, and proper support for the tubing above the thread, so as to relieve the thread at its termination of cross-bending strains calculated to rupture the tubing at such point. As is well known to those familiar with the operation of artesian and oil wells, the suspended tubing often weighs several tons independent of the column of fluid therein and under the vibration and shocks of pumping frequently parts at the joints, giving rise to great labor, loss of time, and expense for repairs.

The object of the present invention therefore is the provision of such a support for the tubing above its thread as will render the joint rigid and relieve the thread of cross-bending strains incident to vibration and shocks from pumping or from any other of many well-known causes.

To this end my invention, generally stated, is embodied in an internally-threaded coupling having at its ends longitudinally-slitted and externally-threaded sleeve sections or extensions adapted to encircle the tubing above the thread and receive internally-threaded rings, whereby the slitted sleeve-sections of the coupling are contracted and caused to bind on the ends of the tubing above the threaded portion thereof, and such a construction or its equivalent embodies the main feature of my invention.

I will now proceed to describe my invention more fully, so that others skilled in the art to which it appertains may apply the same.

In the drawings, A A indicate the threaded ends of the tubing to be joined, and B the coupling. The sections of tubing A A may be of the standard sizes with the usual tapering threaded ends. The coupling B will also by preference be of the usual standard so far as the internal thread $b$ and length of the coupling at said point, but will be provided at each end with an internally-smooth sleeve extension C of an inch or more, which will cause the coupling to exceed in length the usual standard coupling by two or more inches. Said sleeve extensions C C are longitudinally slit, as at $c$, preferably their entire depth or down to the internal thread $b$ of the coupling and are each provided on the exterior with a tapered thread $c'$ for the reception of an internally-threaded tapered ring D.

The coupling B, with the slotted extensions C C, having the characteristics hereinbefore pointed out, will combine with the tube-sections A A to form a rigid joint, as follows: The internally-smooth sleeve-sections will operate as guides to center the threads of the tubing A, and the pipes or tubes having been screwed home in the central threaded section B until a tight joint has been secured the tapered rings D D are screwed home on the externally-threaded and slit sleeve extensions C C until the same are caused to contract and bind uniformly upon the tube-sections A A above the threads thereon, thus obtaining a rigid joint and relieving the threads from the cross-bending strains incident to vibration of the tubing.

Having thus described the nature and advantages of my invention, what I claim, and desire to secure by Letters Patent, is—

1. In a pipe-coupling the combination with an internally-threaded coupling having externally-threaded and longitudinally-slit sleeve extensions, of internally-threaded rings adapted to confine the sleeve extensions of the coupling, substantially as and for the purposes specified.

2. In a pipe-coupling, the combination with an internally-threaded coupling having slit sleeve extensions provided externally with tapered threads, of tapered internally-threaded rings adapted to the sleeve-sections of the coupling, substantially as and for the purposes specified.

In testimony whereof I affix my signature, in presence of two witnesses, this 28th day of June, 1899.

THOMAS J. BRAY.

Witnesses:
HENRY WEISKETTLE,
LOUIS BROWN.